(12) United States Patent
Smyth (10) Patent No.: US 7,188,101 B2
(45) Date of Patent: Mar. 6, 2007

(54) SYSTEM AND METHOD FOR RETREIVING DATABASE ITEMS WITH INCREASED DIVERSITY

(75) Inventor: Barry Joseph Smyth, Dublin (IE)

(73) Assignee: University College Dublin, Dublin (IE)

( * ) Notice: Subject to any disclaimer, the term of this patent is extended or adjusted under 35 U.S.C. 154(b) by 234 days.

(21) Appl. No.: 10/485,156

(22) PCT Filed: Jul. 30, 2002

(86) PCT No.: PCT/IE02/00113

§ 371 (c)(1),
(2), (4) Date: Jan. 29, 2004

(87) PCT Pub. No.: WO03/012684

PCT Pub. Date: Feb. 13, 2003

(65) Prior Publication Data

US 2004/0193582 A1 Sep. 30, 2004

(30) Foreign Application Priority Data

Jul. 30, 2001 (IE) .............................. S2001/0724

(51) Int. Cl.
*G06F 17/30* (2006.01)

(52) U.S. Cl. .............. 707/3; 707/2; 707/4; 707/5; 707/6; 707/7; 707/8; 707/9; 707/10; 707/101; 709/219; 706/54

(58) Field of Classification Search .............. 707/1–10, 707/101; 709/219; 706/54
See application file for complete search history.

(56) References Cited

U.S. PATENT DOCUMENTS

| 5,619,709 | A | * | 4/1997 | Caid et al. ................... 715/532 |
| 5,794,178 | A | * | 8/1998 | Caid et al. ..................... 704/9 |
| 5,978,785 | A | * | 11/1999 | Johnson et al. ............... 706/54 |
| 6,029,195 | A | * | 2/2000 | Herz .......................... 725/116 |
| 6,701,195 | B2 | * | 3/2004 | Brown et al. .................. 700/44 |
| 6,936,476 | B1 | * | 8/2005 | Anderson et al. ........... 436/518 |

OTHER PUBLICATIONS

Aggarwal et al., "A New Method for Similarity Indexing of Market Basket Data", 1999, ACM, pp. 407-418.*

* cited by examiner

*Primary Examiner*—Sathyanarayan Pannala
(74) *Attorney, Agent, or Firm*—Nath & Associates PLLC; Gregory B. Kang; Matthew J. Moffa (57) ABSTRACT

A data processing method and system for retrieving a subset of k items from a database of n items (n≧k) firstly determines a limited set of bk items (b>1) in the database which have the greatest similarity to an input query t according to a given similarity function S. A result subset is then constructed by including as a first member the item having the greatest similarity S to the query t, and iteratively selecting each successive member of the subset as that remaining item of the bk items having the highest quality Q, where Q is a given function of both similarity to the input query t and relative diversity RD with respect to the items already in the results subset. In this way the diversity of the results subset is greatly increased relative to a simple selection of the k most similar items to the query t, with only a modest additional increase in processing requirements.

17 Claims, 7 Drawing Sheets

| t: target query;   C: case base;   k: #results;   b: bound |
|---|

| | |
|---|---|
| 1. | define BoundedRandomSelection (t, C, k, b) |
| 2. | begin |
| 3. | C' := bk cases in C that are most similar to t |
| 4. | R := k random cases from C' |
| 5. | return R |
| 6. | end |

| | |
|---|---|
| 1. | define GreedySelection (t, C, k) |
| 2. | begin |
| 3. | R:= {} |
| 4. | For i := 1 to k |
| 5. | Sort C by Quality (t, C, R) for each c in C |
| 6. | R := R + First (C) |
| 7. | C := C - First (C) |
| 8. | EndFor |
| 9. | return R |
| 10. | end |

| | |
|---|---|
| 1. | define BoundedGreedySelection (t, C, k, b) |
| 2. | begin |
| 3. | C' := bk cases in C that are most similar to t |
| 4. | R:= {} |
| 5. | For i := 1 to k |
| 6. | Sort C' by Quality (t, C, R) for each c in C' |
| 7. | R := R + First (C') |
| 8. | C' := C' - First (C') |
| 9. | EndFor |
| 10. | return R |
| 11. | end |

| Set R | ID  | Similarity to t |
|-------|-----|-----------------|
| r1    | 142 | 0.99            |
| r2    | 188 | 0.92            |
| r3    | 021 | 0.92            |
| r4    | 122 | 0.90            |
| r5    | 217 | 0.88            |
| r6    | 066 | 0.84            |
| r7    | 068 | 0.84            |
| r8    | 010 | 0.81            |
| r9    | 149 | 0.80            |
| r10   | 116 | 0.79            |
| r11   | 226 | 0.79            |
| r12   | 139 | 0.79            |
| r13   | 187 | 0.78            |
| r14   | 200 | 0.71            |
| r15   | 045 | 0.70            |

Fig. 9B

| Set R' | ID  |
|--------|-----|
| r'1    | 142 |
| r'2    | 122 |
| r'3    | 010 |
| r'4    | 116 |
| r'5    | 200 |

Fig. 9C

| Set R | ID  | Most similar to: |
|-------|-----|------------------|
| r2    | 188 | r'1              |
| r3    | 021 | r'1              |
| r5    | 217 | r'2              |
| r6    | 066 | r'2              |
| r7    | 068 | r'4              |
| r9    | 149 | r'4              |
| r11   | 226 | r'4              |
| r12   | 139 | r'1              |
| r13   | 187 | r'5              |
| r15   | 045 | r'4              |

Fig. 9D

| Set R' | ID  | Similar items      |
|--------|-----|--------------------|
| r'1    | 142 | r2, r3, r12        |
| r'2    | 122 | r5, r6             |
| r'3    | 010 | -                  |
| r'4    | 116 | r7, r9, r11, r15   |
| r'5    | 200 | r13                |

SYSTEM AND METHOD FOR RETREIVING DATABASE ITEMS WITH INCREASED DIVERSITY

BACKGROUND OF THE INVENTION

1. Field of the Invention

This invention relates to a system and method for the retrieval of data from a database according to predetermined criteria.

2. Description of the Related Art

Case-based reasoning (CBR) systems solve new problems by reusing the solutions to problems that have been previously solved and stored as cases in a case-base. The success of any CBR system depends on its ability to select the right case for the right target problem (see, for example, Kolodner, J.: *Case-Based Reasoning*. Morgan Kaufmann, 1993; Smyth, B. and Keane, M.: Adaptation-Guided Retrieval: Questioning the Similarity Assumption in Reasoning. *Artificial Intelligence*, 102:249–293, 1998; and Aamodt, A. and Plaza, E.: Case-Based Reasoning: Foundational Issues, Methodological Variations, and System Approaches. *AI Communications*, 7(1):39–52, 1994).

The conventional wisdom is that the right case is among those that are the most similar to the target problem, and thus considerable research effort has been invested into techniques and strategies for evaluating case similarity (see also Faltings, B.: Probabilistic Indexing for Case-Based Prediction. In: *Proceedings of the 2nd International Conference on Case-Based Reasoning*, pages 611–622. Springer-Verlag, 1997; Leake, D. B.: *Case-Based Reasoning: Experiences, Lessons and Future Directions*. AAAI/MIT Press, 1996; Smyth, B.: and McKenna, E.: Incremental Footprint-Based Retrieval. In: Proceedings of the 21st SGES International Conference on Knowledge Based Systems and Applied Artificial Intelligence, pages 89–101. Springer Verlag, 2000).

Recently it has become clear that traditional notions of similarity are not always ideal, inspiring many researchers to look for alternative ways to judge the utility of a case in a given problem solving context (e.g. see Bergmann, R., Richter, M., Schmitt, S., Stahl, A. and Vollrath, I.: Utility-Oriented Matching: A New Research Direction for Case-Based Reasoning. In: *Proceedings of the German Workshop on Case-Based Reasoning*, 2001; Burke, R.: Conceptual Indexing and Active Retrieval of Video for Interactive Learning Environments. *Knowledge-Based Systems*, 9(8): 491–499, 1996; Fox, S. and Leake, D. B.: Using Introspective Reasoning to Refine Indexing. In: *Proceedings of the 14th International Joint Conference on Artificial Intelligence*, pages 391–397. Morgan Kaufmann, 1995; Kolodner, J.: Judging which is the "best" case for a case-based reasoner. In: *Proceedings of the Second Workshop on Case-Based Reasoning*, pages 77–81. Morgan Kaufmann, 1989; Leake, D. B.: Constructive Similarity Assessment: Using Stored Cases to Define New Situations. In: *Proceedings of the 14th Annual Conference of the Cognitive Science Society*, pages 313–318. Lawrence Earlbaum Associates, 1992). For example, researchers have looked at the importance of adaptability alongside similarity, arguing that while a case may appear to be similar to a target problem, this does not mean it can be successfully adapted for this target.

The Internet is now almost synonymous with the so-called information overload problem as users find it more and more difficult to locate the right information at the right time. Recently a new type of information system called the recommender system has been developed to better serve the information needs of individual users. Recommender systems combine techniques from information retrieval, artificial intelligence, and user profiling to proactively predict the needs of individual users and provide more personalised information services.

Many recommender systems, such as Entree (Burke, R.: A case-based approach to collaborative filtering. In: *Proceedings of the 5th European Workshop on Case-Based Reasoning*. Springer-Verlag, 2000), employ a CBR strategy, selecting the most similar cases for a given query. Entree operates in the restaurant domain and allows users to query the restaurant case-base using features such as cuisine type, price, etc. By design, Entree returns a single best case but allows the user to tweak this result, if they are unhappy with the case, to produce a refined query for a new search.

Very often a recommender system will be designed to return a number of similar cases in order to provide the user with a choice of recommendations. For example, popular applications such as travel or property recommenders typically return the k best cases (holiday packages or apartment listings) for a user query. The objective is to satisfy user needs with a single search, hence the retrieval of multiple cases, and to maximise the likelihood of relevant cases appearing high up in the result list, hence the priority given to similarity.

However, this standard pure similarity-based retrieval strategy is flawed in some application domains. Consider a travel recommender: a user submits a query for a 2-week vacation for two in the sun, costing less than $750, within 3 hours flying time of Ireland, and with good night-life and recreation facilities on-site. The top recommendation returned is for an apartment in the a particular apartment block in the Costa Del Sol, Spain, for the first two weeks in July. This may be a good recommendation, but what if the second, third, and fourth recommendations are from the same apartment block, albeit perhaps for different two-week periods during the summer? While the k best recommendations are all very similar to the target query, they are also very similar to each other. The user will not have received a useful set of alternatives if the first recommendation is unsuitable. For instance, in this example, if the user decides to avoid the Costa Del Sol, then none of the alternative recommendations will suffice and she will have to initiate a new search.

BRIEF SUMMARY OF THE INVENTION

By prioritising similarity during retrieval a standard case-based approach will implicitly ignore the importance of retrieval diversity, and this may reduce the quality of the retrieval results. Often, it is not good enough for a recommender to return only the most similar cases. It should also return a diverse set of cases in order to provide the user with optimal coverage of the information space in the vicinity of their query. This diversity problem is a recognised shortcoming of case-based or content-based recommendation techniques (Smyth, B. and Cotter, P.: A Personalized TV Listings Service for the Digital TV Age. *Journal of Knowledge-Based Systems*, 13(2–3):53–59, 2000). Indeed one common solution is to consider alternative recommendation techniques, such as automated collaborative filtering, that are less susceptible to the diversity problem. For example, PTV (a personalized television listings guide) operates in the TV listings domain, recommending TV programmes to users based on their learned viewing preferences. PTV combines case-based recommendation with collaborative filtering in order to help guarantee that each user is delivered a diverse set of recommendations, rather than recommending only science fiction programmes to users known to be science fiction devotees.

New developments in the area of mobile information access further highlight the need for recommender systems that attempt to optimise both similarity and diversity. Current mobile computing devices such as personal digital assistants (PDAs) and Wireless Application Protocol (WAP) enabled mobile phones have a screen size that is a fraction of that found on a typical PC; a mobile phone screen can be 200 times smaller than a PC screen. This reduces the number of recommendations that can be returned in a single search, and since users dislike scrolling the goal has to be to return a result list that will fit on a single screen page. On a WAP-device this means a list of only 3 or 4 cases. If all of these cases are essentially the same (such as vacations in the same apartment block) then the chances of satisfying the user in a single search are greatly reduced. However, if the recommendations are relevant (similar to the target query) and diverse then there is a much greater chance of success.

Accordingly, the present invention provides a data processing method for retrieving a subset of k items from a database of n items (n>>k), the method comprising:
 (a) determining the bk items (b>1) in the database of n items which have the greatest similarity to an input query t according to a given similarity function S,
 (b) selecting as the first member of the subset that item of the bk items having the highest similarity S to the query t, and
 (c) iteratively selecting each successive member of the subset as that remaining item of the bk items having the highest quality Q, where Q is a given function of similarity S to the input query t and relative diversity RD, wherein relative diversity RD is a given function of the diversity of that remaining item with respect to the items selected during the previous iteration(s).

The invention further provides a data processing system for retrieving a subset of k items from a database of n items (n>>k), the system comprising:
 (a) a first memory area for storing the bk items (b>1) in the database of n items which have the greatest similarity to an input query t according to a given similarity function S,
 (b) a second memory area for storing said subset as it is constructed from said bk item, and
 (c) a processor for
  (i) selecting as the first member of the subset that item of the bk items having the highest similarity S to the query t, and
  (ii) iteratively selecting each successive member of the subset as that remaining item of the bk items having the highest quality Q, where Q is a given function of similarity S to the input query t and relative diversity RD, wherein relative diversity RD is a given function of the diversity of that remaining item with respect to the items selected during the previous iteration(s).

In a further aspect there is provided a computer program comprising instructions which when executed on a data processing system are effective to cause the data processing system to carry out the method of the present invention.

The computer program of the invention can be provided on a computer program product in machine readable form or as an electrical signal encoding the computer program.

BRIEF DESCRIPTION OF THE DRAWINGS

Embodiments of the invention will now be described, by way of example, with reference to the accompanying drawings, in which.

DETAILED DESCRIPTION OF THE INVENTION

In case-based recommenders, the normal approach to measuring the similarity between a case c and target query t is to use a weighted-sum metric, Equation 1.

$$\text{Similarity}(t, c) = \frac{\sum_{i=1\ldots n} w_i * sim(t_i, c_i)}{\sum_{i=1\ldots n} w_i} \qquad \text{Equ. 1}$$

In this weighted-sum metric, the target t and the case c each have a number n of features which can be compared using a similarity function sim, and each of the features has a weight w attached to it. For example, if the search was for a 14 night package holiday having a cost of US$800, with the resort preferably located not more than 20 kilometers from an airport, there would be three features for comparison, and the function sim might be calculated as follows:

(i = 1)

No. of nights: $sim(t_1, c_1) = 1$ if $|t_1 - c_1| \leq 1 = 0$ otherwise (so for a case having a duration of 13, 14 or 15 nights the sim function returns a value of 1, when the target query specifies 14 nights).

(i=2)

Price: $sim(t_2,c_2)=1-(|t_2-c_2|/\max(t_2,c_2))$ where $|t_2-c_2|$ is the absolute value of the difference between $t_2$ and $c_2$, and where $\max(t_2,c_2)$ is equal to the greater of the values of $t_2$ and $c_2$ (so for a case having a price of US$1250 the sim function returns a value of 1−(250/1250)=0.8 when the target query specifies a price of US$1000).

$$(i = 3)$$

$$\text{Distance: } sim(t_3, c_3) = 1 \text{ if } c_3 \leq t_3 = 0.5 * t_3 / c_3 \text{ otherwise}$$

(so for a case having a distance from airport value of 25 kilometers, the sim function returns a value of 0.5*(20/25)= 0.4 when the target query specifies a distance of up to 20 kilometers).

It may be the case that the recommender system is programmed to give a strong weighting $w_1$ to the number of nights ($w_1$=5), a less strong weighting to price ($w_2$=3), and a weak weighting to distance ($w_3$=0.5). So for a case having duration=14 nights, price=US$1600 and distance from airport=25 kilometers, the value returned for similarity for the target query given above would be [(5*1)+(3*0.25)+(0.5*0.4)]/(8.5)=0.7.

A 7 night holiday having the target's specified price and airport distance would return a value, with this weighting scheme, of [(5*0)+(3*1)+(0.5*1)]/(8.5)=0.41. A 14 night holiday costing US$1000 and located 15 kilometers from the airport would, as expected, return a "perfect match" similarity rating of [(5*1)+(3*1)+(0.5*1)]/(8.5)=1.

Figure 2:
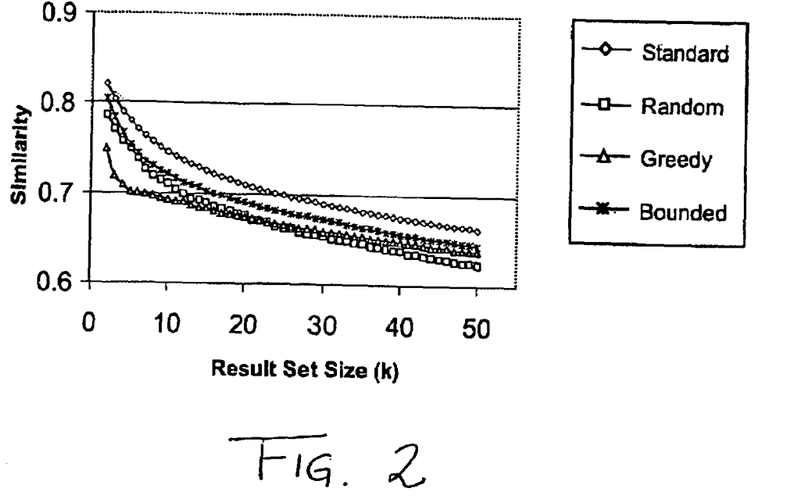
FIG. 2 is a graph of the similarity characteristics of the diversity-preserving algorithms relative to retrieval set size (k).

Selecting the k most similar cases usually results in a characteristic similarity profile where the average similarity of the result set reduces gradually for increasing values of k (see FIG. 2).

We define the diversity of a set of cases, $c_1, \ldots c_n$, to be the average dissimilarity between all pairs of cases in the case-set, (Equation 2). Standard case-based recommenders also display a characteristic diversity profile with diversity increasing for larger result sets (see FIG. 3). Thus the trade-off between similarity and diversity is that for low values of k, while similarity tends to be high, diversity tends to be very low, highlighting the fundamental problem that exists with case-based recommenders.

$$\text{Diversity}(c_1, \ldots c_n) = \frac{\sum_{i=1\ldots n} \sum_{j=1\ldots n} (1 - \text{similarity}(c_i, c_j))}{\frac{n}{2} * (n-1)} \quad \text{Equ. 2}$$

Figure 1:
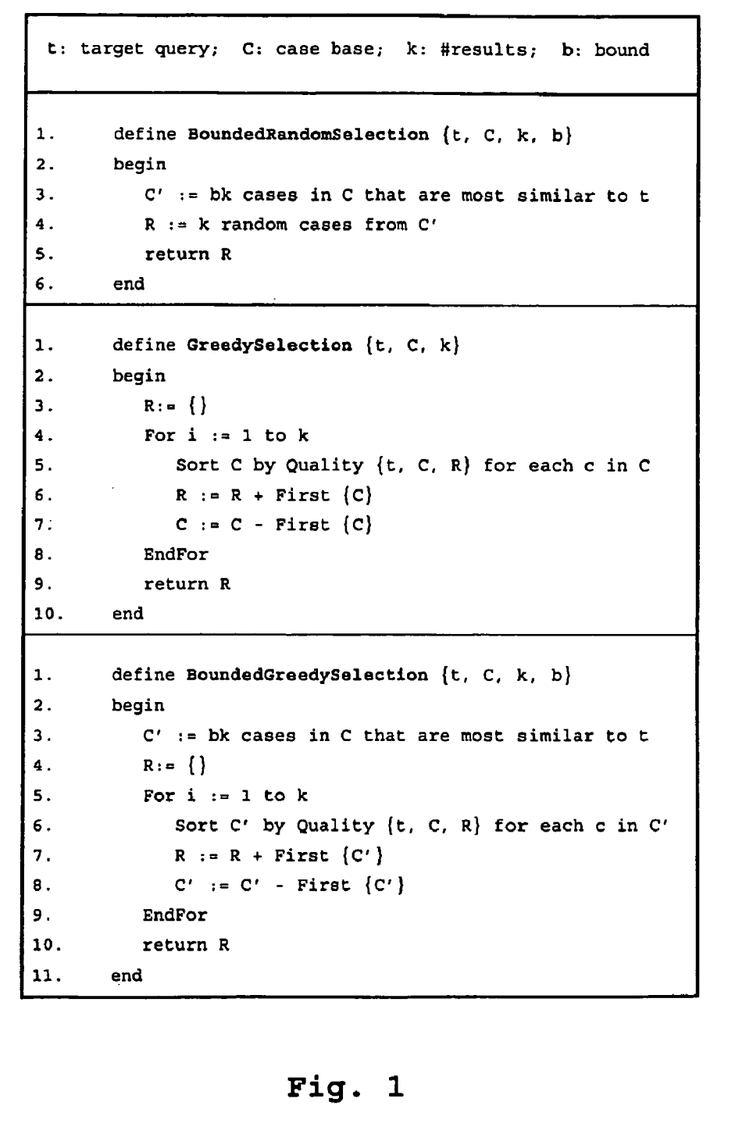
FIG. 1 is a table of diversity preserving retrieval algorithms including the algorithm of the present invention (referred to herein as the "Bounded Greedy Selection" algorithm).

In practice, improving the diversity characteristics of a fixed-size recommendation list means sacrificing similarity. The goal of the present invention is to develop a strategy that optimises this similarity-diversity trade-off, delivering recommendation sets that are diverse without compromising their similarity to the target query. FIG. 1 shows three different strategies for retrieving k cases from a case-base C, given a target query t, each focusing on a different way of increasing the diversity of the recommendation set.

Bounded Random Selection (Random)

The simplest strategy for increasing the diversity of a set of k cases is the bounded random selection method: select the k cases at random from a larger set of the bk most similar cases to the target, with b>1.

Of course as bk->n, Random becomes ineffective as a retrieval method since similarity is essentially ignored. While the retrieved cases may be diverse they are unlikely to be similar to the target. Nevertheless this algorithm does serve as a benchmark against which to evaluate more principled strategies, and for lower values of b it will at least limit the similarity sacrifices albeit perhaps with only modest diversity improvements.

Greedy Selection (Greedy)

A more principled approach to improving diversity, while at the same time maintaining similarity, is to explicitly consider both diversity and similarity during retrieval. Greedy achieves this by incrementally building a retrieval set, R. During each step the remaining cases are ordered according to their quality with the highest quality case added to R.

The key to this algorithm is a quality metric that combines diversity and similarity (Equation 3). The quality Q of a case c is proportional to the similarity between c and the current target t, and to the diversity of c relative to the set of cases R so far selected, $R=\{r_1, \ldots, r_m\}$; see later for alternative quality metrics. The relative diversity metric shown in Equation 4 is a variation of the diversity metric from Equation 2.

$$\text{Quality}(t,c,R) = \text{Similarity}(t,c) * \text{RelDiversity}(c,R) \quad \text{Equ. 3}$$

$$\text{RelDiversity}(c, R) = 1, \text{ if } R = \{\} \quad \text{Equ. 4}$$

$$= \frac{\sum_{i=1\ldots n} (1 - \text{Similarity}(c, r_i))}{m}, \text{ otherwise}$$

The first case to be selected is always the one with the highest similarity to the target. During each subsequent iteration, the case selected is the one with the highest combination of similarity to the target and diversity with respect to the set of cases selected during the previous iteration.

As it stands this algorithm is expensive. For a case-base of n cases, during each of the k iterations we must calculate the diversity of each remaining case relative to those so far selected. This means an average of ½(n−k) relative diversity calculations, each one consisting of an average of ½k similarity calculations. This gives an average total cost of k*½{n−k}*½k similarity computations per retrieval. For example, for a case-base of 1000 cases, retrieving the top 3 cases can mean approximately 2250 similarity computations.

Bounded Greedy Selection (Bounded Greedy)

To reduce the complexity of the greedy selection algorithm we have implemented, in the present invention a bounded version in the same spirit as the bounded random selection algorithm. Bounded Greedy first selects the best bk cases according to their similarity to the target query (line 3) and then applies the greedy selection method to these (lines 4–11).

This new algorithm has a greatly reduced retrieval cost since k cases are selected from bk cases instead of from n cases and bk<<n for typical low values of b and k.

This means a total of k*\½k(b−1)*½k extra similarity computations on top of the normal retrieval cost. For example, for a 1000 case case-base, retrieving the 3 best cases with b=2 will now require about 7 extra similarity computations on top of the standard similarity-based retrieval cost.

Of course this improved efficiency comes at a cost: because we are no longer examining all of the remaining cases we may miss a case with a marginally lower similarity value than the best bk cases but with a significantly better diversity value. Even if such a case has a higher overall quality value it will not be added to the retrieved set because it is not one of the best bk cases. However, the likelihood of this happening decreases with case similarity so that for suitable values of b it becomes unlikely.

Thus, in many application scenarios, especially recommender systems, similarity and diversity both have roles to play in retrieval. However, trade-offs do exist. Increasing retrieval diversity means decreasing the similarity of the retrieved cases to the target query. The objective of the present invention is to develop an efficient retrieval strategy that is capable of maximally improving diversity while minimally compromising similarity. This requirement is met by the Bounded Greedy Selection algorithm.

To demonstrate this we evaluate the algorithms using a standard benchmark case-base, the Travel case-base (www.ai-cbr.org). This case-base contains cases from the travel domain—each describing an vacation in terms of features such as location, duration, etc. Four recommender systems are implemented, each designed to return the k best travel cases for a given query according to one of the following retrieval methods:

Similarity: standard similarity-based retrieval;
Random: retrieval using the bounded random selection algorithm (b=2);
Greedy: retrieval using the greedy selection algorithm;
Bounded Greedy: retrieval using the bounded greedy selection algorithm (b=2).

The most important issue is the trade-off between similarity and diversity in the various retrieval algorithms—is there an increase in retrieval diversity, and if so what is the associated similarity cost?

To investigate this we run a series of retrievals using each recommender system for various values of k. 400 cases are chosen at random from the Travel case-base as queries, with the remaining cases serving as the case-base. For each retrieval we measured the average similarity and overall diversity of the k results. This is repeated 100 times for different sets of 400 queries and from the resulting similarity and diversity measurements we compute an overall average similarity and diversity value for each value of k.

Figure 3:
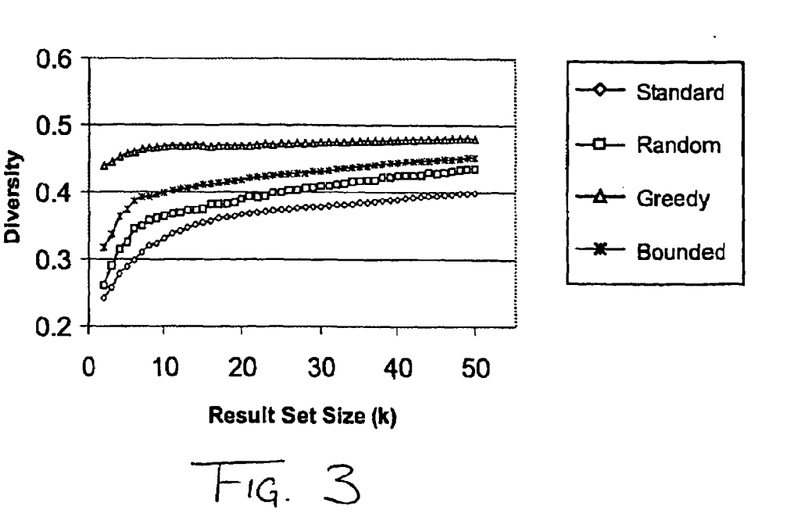
FIG. 3 is a graph of the diversity characteristics of the diversity-preserving algorithms relative to retrieval set size (k).

The results are shown in FIGS. 2 and 3 as graphs of average similarity and diversity against k, respectively. The characteristic similarity and diversity profiles predicted above are clearly seen for each retrieval strategy: in FIG. 2 average similarity drops off with k; and in FIG. 3 average diversity increases with k.

As expected, from a similarity viewpoint, the Standard algorithm works best across all values of k. For example, for k=5 the average similarity for the Standard strategy is 0.78, compared to 0.753, 0.748, 0.7 for the Bounded Greedy, Random, and Greedy techniques, respectively. The Greedy technique fairs worst for values of k<20, after which the Random approach begins to suffer the most (although Random does achieve good similarity for low values of k). Overall the Bounded Greedy technique of the present invention performs well from a similarity standpoint, achieving over 97% of the optimal (Standard) similarity level on average across all values of k—in comparison, on average the Greedy and Random techniques achieve only 94.5% and 94.7% of the optimal similarity level.

From a diversity point of view, the Greedy strategy delivers the best diversity characteristics across all values of k. For example, for k=5 the average diversity for the Greedy strategy is 0.458, compared to 0.375, 0.326, 0.289 for the Bounded Greedy, Random, and Standard techniques respectively. If we consider the Greedy algorithm to deliver optimal diversity then the Bounded Greedy technique performs very well, achieving 90% of optimal diversity on average across all values of k—by comparison, the Standard and Random techniques achieve, on average, only 76% and 83% of the Greedy diversity values. Even for low values of k, such as k=5, Bounded Greedy achieves over 80% of the Greedy diversity, compared to 74% and 69% for the Random and Standard methods, respectively.

Another way to look at these results is to consider the number of cases that need to be retrieved in order to achieve a certain level of diversity. The Bounded Greedy algorithm of the invention achieves a mean diversity of 0.4 for k=10, with a corresponding mean similarity of 0.72. The Random method only achieves this diversity at k=23, and the Standard method only achieves it at k=46, with similarities that have fallen to 0.66 and 0.67, respectively. This ability of the Bounded Greedy method to achieve high diversity and similarity with small retrieval sets is an important advantage in recommender systems.

Overall the Bounded Greedy algorithm offers the best performance, with near optimal similarity and diversity characteristics across all values of k. In contrast, the Greedy and Random strategies suffer from more significant similarity compromises, while the Standard and Random techniques suffer from significant diversity compromises.

In general how does the increase in diversity relate to the loss in similarity? We attempt to answer this question by measuring increases in diversity relative to decreases in similarity for the three diversity preserving algorithms (Random, Greedy, and Bounded Greedy). For each of the three algorithms, and each value of k, we measure the relative benefit of the algorithm in question by dividing the difference in diversity (compared to Standard), by the difference in similarity (compared to Standard). For example, a relative benefit of 1 means that every unit increase in diversity is accompanied by a corresponding unit drop in similarity—the similarity and diversity trade-off is perfectly balanced. For an algorithm to perform well it should offer relative benefit values greater than one; that is, decreases in similarity should be compensated for by greater increases in diversity.

Figure 4:
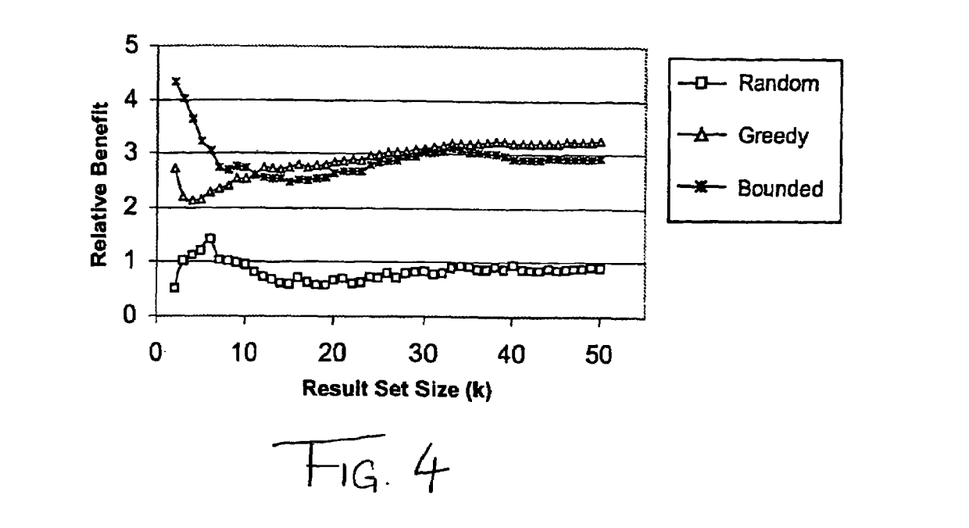
FIG. 4 is a graph of the relative benefits of the diversity-preserving algorithms.

The results are shown in FIG. 4 as a graph of relative benefit against k. The Random strategy performs poorly with a relative benefit less than one for most values of k, and an average relative benefit of 0.83. In contrast, the Greedy and Bounded Greedy algorithms perform very well with relative benefits greater than one across all values of k. and average relative benefits of 2.9. In other words, on average, a unit drop in similarity can be traded for almost 3 units of diversity using the Greedy and Bounded Greedy algorithms.

Importantly, the Greedy and Bounded Greedy algorithms both perform very well for low values of k. For example, the Bounded Greedy method has a relative benefit of 3.6 for k=3. This is important since many recommenders are designed to return small result lists (typically k<10) and so it is useful that these algorithms deliver maximal relative benefits when k is small. In general, the Bounded Greedy algorithm has higher relative benefits than the Greedy algorithm for k<11.

Of course in any real-time CBR system, the efficiency of the retrieval algorithm is just as important as the quality of the retrieved cases. So far we have seen that the Greedy and Bounded Greedy algorithms benefit from improved diversity characteristics, but these benefits are only useful if they can be achieved without significant additional retrieval cost.

In CBR the typical nearest-neighbour approach to retrieval compares the target to every case in the case-base—this is the retrieval method used in the Standard strategy. In this experiment we evaluate the efficiency of the Random, Greedy, and Bounded Greedy methods in the light of this benchmark efficiency. We set k=6 and measure retrieval cost as the number of similarity computations required for the four retrieval techniques. For each set of 400 target queries we compute and average the retrieval times over different case-base sizes from 100 cases to 1000 cases.

Figure 5:
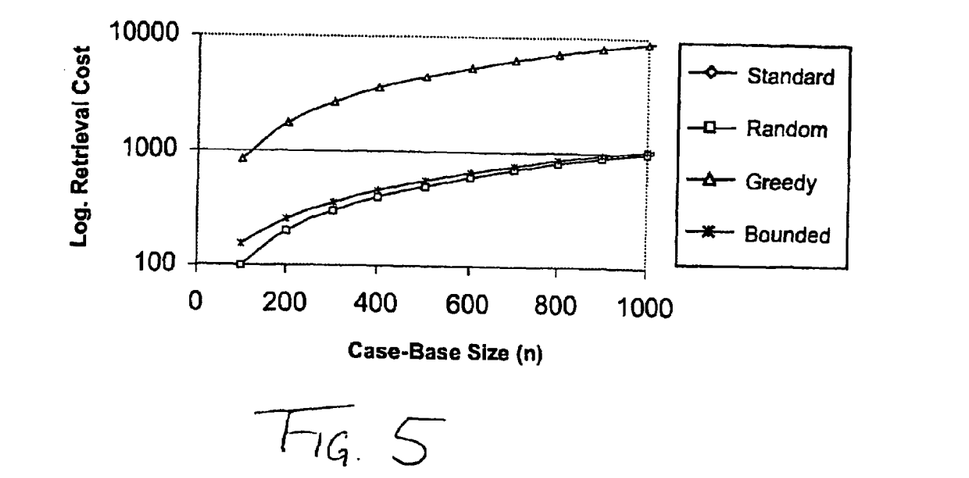
FIG. 5 is a graph of the retrieval costs versus case-base size (n) for the diversity-preserving algorithms.
Figure 6:
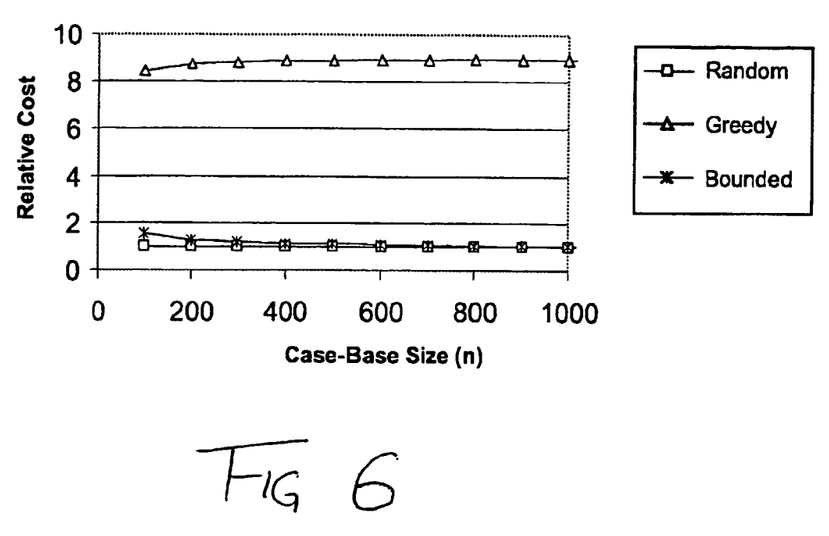
FIG. 6 is a graph of the relative cost of the diversity-preserving algorithms compared to the standard algorithm.

The results are shown in FIG. 5 as the logarithm of retrieval cost against case-base size, and in FIG. 6 as the relative retrieval cost increase of each algorithm compared to Standard, against case-base size. Clearly, the Greedy algorithm performs poorly, with high retrieval costs across all case-base sizes, backing up our complexity analysis above. For example, for a case-base of 1000 cases, the Greedy algorithm requires an average of nearly 9000 similarity computations for each retrieval at k=6 (a relative cost increase of 9). The other algorithms perform a lot better. The Standard and Random methods have the same benchmark efficiency characteristics, and the Bounded Greedy algorithm suffers from only a minor reduction in efficiency compared to Standard, again supporting the complexity analysis in Section 3. For example, for a 1000 case case-base, the Bounded Greedy algorithm (with k=6 & b=2) requires only 1054 similarity computations, representing a 5% increase in relative retrieval cost over the Standard method (an extra 54 similarity computations). Moreover this increase is independent of case-base size, since it depends on k and b only.

The above demonstrates that, in the given test domain at least, the Greedy and Bounded Greedy algorithms allow retrieval diversity to be improved without sacrificing retrieval similarity; we have carried out similar experiments in the movie domain with similar results. However, the positive performance of the Greedy algorithm is offset by its very high retrieval costs, but the Bounded Greedy algorithm provides a more cost-effective solution, with only a minor decrease in efficiency compared to standard retrieval. In fact, Bounded Greedy out-performs Greedy, not only in efficiency, but also in the way that it trades-off similarity for diversity for reasonable values of k.

Figure 7:
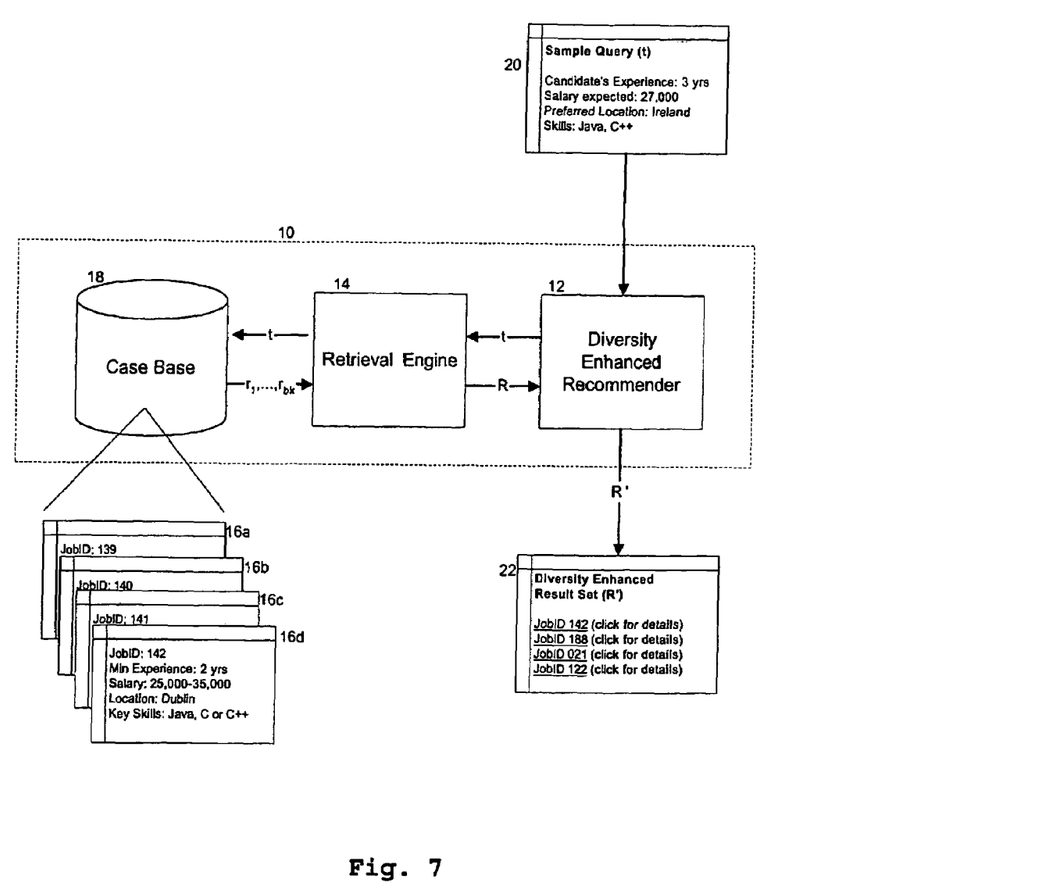
FIG. 7 is a block diagram of a recommender system according to an embodiment of the invention operating according to the Bounded Greedy Selection algorithm.

FIG. 7 is a block diagram of an embodiment of a recommender system 10 operating according to the present invention. The embodiment comprises a Diversity Enhanced Recommender 12, operating according to the Bounded Greedy Selection algorithm, in combination with an existing retrieval engine, the CASPER case-based retrieval engine 14. The CASPER CBR retrieval engine is an intelligent search engine for use in specialised Internet information retrieval applications. CASPER CBR has been implemented for an online recruitment website, specialising in the provision of job listings. The listings 16a–16d are stored as entries in a case base or database 18 and contain features such as required experience, salary offered, skills required, etc., for each position vacant.

However, the CASPER CBR retrieval engine 14 is designed to be generally applicable and can be used in any context where the retrieval candidates can be described as feature-based cases.

The CASPER CBR provides an initial retrieval system for the Diversity Enhanced Recommender 12 and provides it with results in the form of cases and their similarity scores. The Diversity Enhanced Recommender 12 therefore is independent of the retrieval technique and can be applied to any retrieval engine that provides similarity information.

Figure 8:
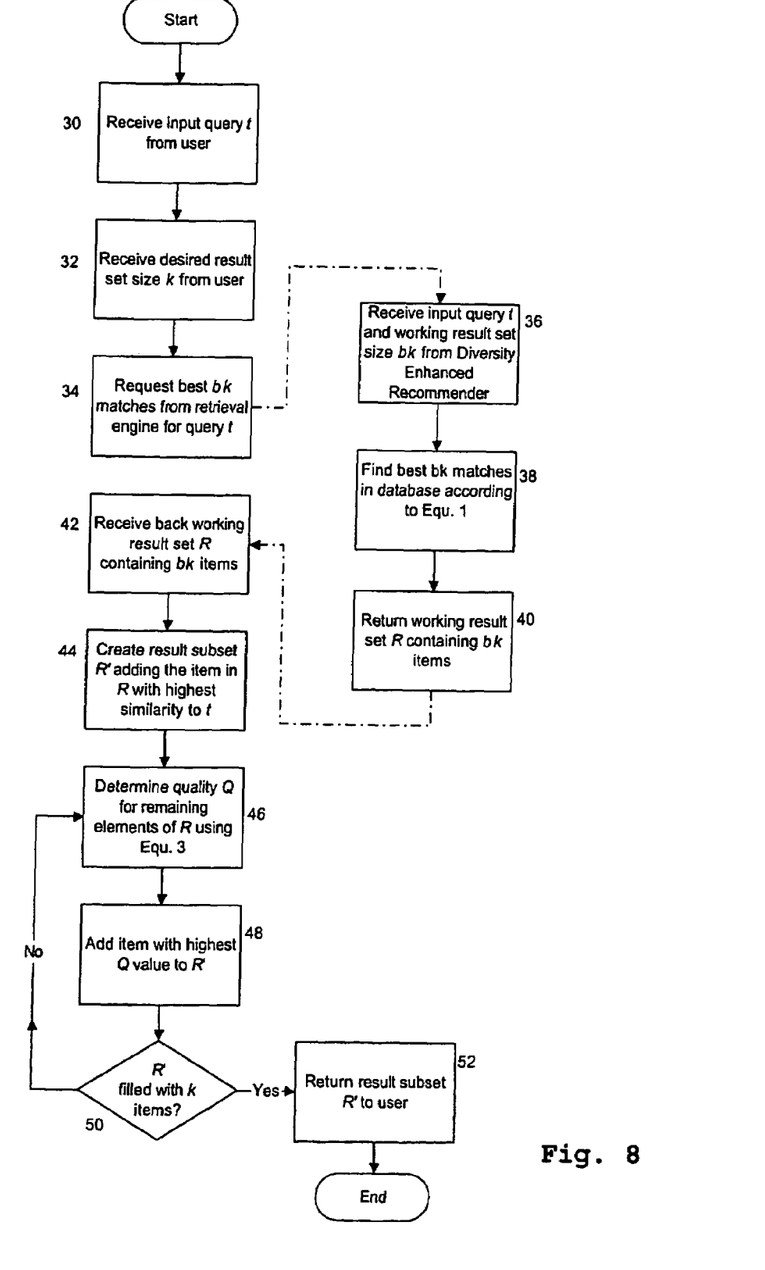
FIG. 8 is a flow diagram illustrating the operation of the recommender system of FIG. 7.

The Diversity Enhanced Recommender 12 is preferably implemented in a computer operating under the control of software according to the invention. FIG. 8 is a flowchart illustrating the operation of such software.

Referring to FIGS. 7 and 8, the Diversity Enhanced Recommender 12 receives a query t from a user, step 30 (FIG. 8). This query 20 describes the user's ideal job as a series of features and forms a target case for the retrieval engine. Typically, the query will be entered by a user filling in a form whose fields correspond to the features used for comparing the query t with the case base entries 16a–16d. The user will access the Diversity Enhanced Recommender via e.g. the Internet or a WAP portal, with the Diversity Enhanced Recommender including a web or WAP server for allowing queries to be submitted. Various other mechanisms for submitting queries can also be used, and these will readily present themselves to the skilled person.

The user may specify in step 32 the number k of results to be returned (or this may be set as a default in the system). Ordinarily a retrieval system such as the CASPER CBR system would retrieve the k candidates most similar to the target from its case base. However the Diversity Enhanced Recommender 12 attempts to maximise the quality of the results where quality is determined by a trade-off between similarity and diversity according to the Bounded Greedy Selection algorithm.

The Recommender therefore requests from CASPER, step 34, the bk most similar candidates, where b has a low value such as 2 or 3. CASPER receives the request, step 36, and then uses the query t to retrieve the bk most similar cases to the target case, step 38. In this embodiment CASPER returns, with each item, the similarity rating to the query t as determined using Equation 1 which it (CASPER) used to select the best bk items. This set of retrieved cases (working result set R) is then returned to the Diversity Enhanced Recommender 12, step 40, to be used as a basis from which the Diversity Enhanced Recommender chooses the k highest quality candidates.

After receiving the working result set R, step 42, the Diversity Enhanced Recommender 12 begins to build up the result subset R' for presentation to the user. During this process of choosing the k highest quality candidates the Diversity Enhanced Recommender 12 starts by creating a new result subset R' by first adding the item or element in the working result set R with the highest similarity rating (as returned by CASPER). This item becomes member $r'_1$ of subset R', step 44.

Then, each of the remaining bk−1 items in R is analysed against the sole member of R' to determine its relative diversity (=1−(similarity of the item to $r'_1$)), i.e. using Equation 4. As indicated below a different measure of relative diversity can be used if desired.

The Relative Diversity for each of the remaining (bk−1) items in R is multiplied by the similarity rating returned for that item by CASPER (i.e. similarity to the original query or target t) to provide a quality measurement Q (Equation 5), step 46, first iteration.

Again, as discussed below one can use alternative functions for the quality measurement Q, which provide different relative levels of importance to similarity (to target t) and relative diversity (to result set R').

The item with the highest value of Q is added to R' by the Diversity Enhanced Recommender 12 as element $r'_2$, step 48, first iteration. The process then iterates by measuring the relative diversity of each of the remaining (bk−2) items in R with respect to both $r'_1$, and $r'_2$ (i.e. for element c, RD(c)= ((1−similarity(c,$r'_1$))+(1−similarity(c,$r'_2$))/2 and the product of this RD measurement and the similarity measurement for item c provides an updated value of Q, step 46, second iteration, which ranks the (bk−2) items for their suitability to add to R' as member $r'_3$, step 48, second iteration. It should be noted that the member with the highest value Q in this iteration will most likely be different to the second highest ranked member in the previous iteration (which just missed out on being added to R' in that previous iteration), since now diversity from element $r'_2$ is an important factor in Q whereas in the previous iteration it was not.

After each iteration, the Diversity Enhanced Recommender 12 checks, step 50, to see if the result subset R' has been filled with k items, and if not, a further iteration of steps 46 and 48 is performed to add an additional member r'm to the result subset R'.

In this way the set R' of k items with the highest quality in each iteration is filled, and the result set R' is returned to the user, step 52. This process can take place in the background from the user's viewpoint, and so the user will fill in a form in step 30, and click "submit" on the page containing the form. The user awaits the next page to load, and this page is created dynamically at the termination of the process of FIG. 8, arriving at the user's desktop or WAP phone as a page which may provide details of each job, or as shown in FIG. 7, may simply be a page of links 22 which can be clicked on to retrieve the job details 16a–16d from the Diversity Enhanced Recommender 12 or the database 18.

As mentioned above, the present invention is particularly useful in applications such as recommendation systems designed for use on WAP-enabled mobile phones. Because of the limited capabilities of these devices, such as reduced screen sizes and restricted input options, a standard, similarity-driven case-based recommender would not succeed because of the limited diversity of the recommendation results. For instance, a typical interaction might see a user with an interest in science fiction and drama, and a preference for Stephen Spielberg films, being recommended Back to the Future 1, 2, and 3 as the top suggestions—a limited choice indeed. Clearly a more diverse set of recommendations (such as Back to the Future 1, Jurassic Park, and Saving Private Ryan) would be preferable.

By using the Bounded Greedy diversity technique of the present invention it has been possible to develop a WAP-based movie recommender that is capable of delivering more diverse and more appropriate recommendations.

CBR is just one of a number of similarity-based reasoning paradigms. In recommender systems, for example, automated collaborative filtering (ACF) is a related strategy (see e.g. Konstan, J. A., Miller, B. N., Maltz, D., Herlocker, J. L., Gorgan, L. R., and J. Riedl.: Applying collaborative filtering to Usenet news. *Communications of the ACM*, 40(3):77–87, 1997;

Smyth, B. and Cotter, P.: A Personalized TV Listings Service for the Digital TV Age. *Journal of Knowledge-Based Systems*, 13(2–3):53–59, 2000) based on the retrieval and reuse of user profiles rather than solution cases. User profiles are composed of previous content item ratings, and the ratings contained within the profiles of the selected similar users are used as a source of ranked recommendations for the target user.

Very often ACF techniques are also guilty of blindly following the similarity assumption. A retrieved set of similar user profiles may all be very similar to each other. Thus, they may contain ratings for the same narrow set of content items thereby limiting the possible recommendations. The Bounded Greedy algorithm can be used in any similarity-based reasoning system, including ACF systems. Instead of retrieving a set of k profiles that are maximally similar to the target user, select profiles that are similar to the target while at the same time different from each other. Once again all that is required is the existing profile similarity metric. The resulting profiles will tend to cover a larger space of rated content items and so offer a more diverse recommendation source.

In the foregoing we have proposed one quality metric (Equation 3) to drive the diversity preserving algorithmns. However, other quality metrics may be used, see, for example, FIGS. 5 and 6. Equation 5 allows for the relative importance of similarity and diversity to be controlled by modifying alpha, which may be useful at the application level. Equation 6 defines quality as the harmonic mean of the similarity and relative diversity values. A weighted harmonic mean is also possible to provide for a way of balancing the relative importance of similarity and diversity as in Equation 5; this is related to the F-measure in information retrieval research.

$$\text{Quality}(t,c,R) = \alpha * \text{Similarity}(t,c) + (1-\alpha) * \text{RelDiversity}(c,R) \quad \text{Equ. 5}$$

$$\text{Quality}(t, c, R) = 2 \Big/ \left( \frac{1}{\text{Similarity}(t, c)} + \frac{1}{\text{RelDiversity}(c, R)} \right) \quad \text{Equ. 6}$$

Relative diversity has been measured, in previous examples, as a measure of dissimilarity between an item in the set of bk items and the item(s) already added to the result subset $R\{r_1, \ldots, r_m\}$. This dissimilarity measurement between c and each case in R is given as (1-similarity($c,r_i$)), where similarity was returned as a value between zero and unity. This is by no means the only method of measuring relative diversity, and in some cases an alternative measure will be more useful.

One alternative would be to change the way that relative diversity is calculated so that instead of measuring the dissimilarity between c and each case in R, we simply count the percentage of different features between c and $r_i$. That is, $$\text{RelDiversity}(c, R) = 1, \text{ if } R = \{\} \quad \text{Equ. 7}$$
$$= \frac{\sum_{i=1\ldots m} \text{DiffFeatures}(c, r_i)}{m}, \text{ otherwise}$$

where DiffFeatures($c,r_i$)=number of features in c that have values different from the equivalent feature in $r_i$.

Although the above embodiment has implemented the invention in recommender systems, more generally diversity is important in CBR applications where vague target queries are the norm, and thus where the retrieval results must provide broad query coverage. This is especially true in many interactive CBR settings where an end-user is provided with a set of candidate cases and is expected to chose from this set in order to solve the target problem. Recommender systems are good examples of this as are help-desk systems and many conversational case-based reasoning systems.

The invention also has applicability in filtering the results of a conventional search engine, since many existing search engines return, with the result set, a similarity measurement for each result. Internet search engines, for example, can rank results based on search terms according to the number of occurrences of a search term in an indexed or cached webpage, the location of the terms on the page, the presence or absence of the terms in metatags, etc. (all of these criteria would be evaluated using similarity algorithms with weightings, and the result is often returned as a percentage). The Diversity Enhanced Recommender 12 could be implemented as a "front end" solution which mediates between the user and the conventional search engine to filter a result set of e.g. 300 webpages with high similarity into an enhanced result set of 100 webpages with improved diversity.

It will be appreciated that the described embodiment which has a Diversity Enhanced Recommender 12 interacting with a Retrieval or Search Engine is not the only implementation. In particular it is envisaged that the functions of the Diversity Enhanced Recommender 12 can be incorporated in the Retrieval Engine, which would then operate a two-step retrieval process of determining the best bk matches and then building a result set based on the quality function.

When the results subset R' of k items is returned to the user, in the scenario previously descried, there will be a set of discarded results, i.e. the b(k−1) items from set R which were not selected for inclusion in the diversity enhanced subset R'. By definition, some of these discarded results will be more similar to the best of the matches to the target query t than some of the R' members (since they are less diverse than the members of R'). It may be useful to retain these results for presentation to the user.

FIGS. 9A–9D show a number of results tables illustrating a method of achieving this goal. In this simple example, a search for jobs matching a target query t has been conducted as previously described. For simplicity, the parameters k=5 and b=3 have been chosen. Therefore the retrieval engine 14 returns a working result set R (FIG. 9A) containing bk=15 items (r1, r2, . . . , r15) each identified by Job ID number (under which it is indexed in the database) and having the similarity rating as determined by the retrieval engine. Therefore, for this query, the retrieval engine has used the similarity algorithm to retrieve the top 15 matches, whose similarities to the target range from 0.99 down to 0.70. The database will contain many more (n−bk) items with lower similarity, which are ignored from this point on.

Figure 9A:
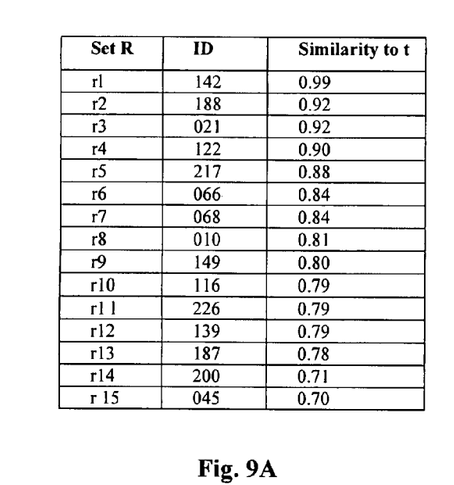
FIG. 9A shows a table of a working result set R.
Figure 9B:
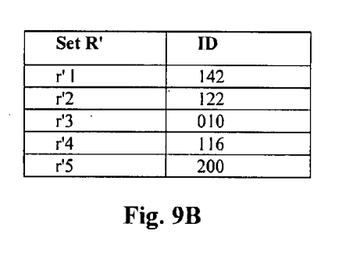
FIG. 9B shows a table of a results subset R' including the items from R with the highest iteratively determined quality.
Figure 9C:
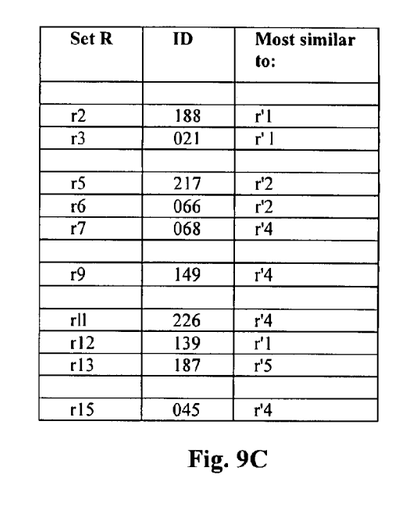
FIG. 9C shows a table of the working result set R with the items of subset R' deleted.
Figure 9D:
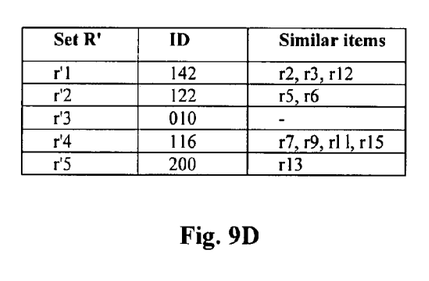
FIG. 9D shows a table of the results subset R' including a column to show the closest matching members remaining in ser R.

The diversity enhanced recommender 1.2 then selects item r1 as the first element of set R' (i.e. item r1 is deleted from set R and added as item r'1 to set R'). Using a quality assessment to locate the item with the highest similarity to t and the best diversity with respect to r'1, item r4 is selected as the next member of set R'. Item r4 is therefore deleted from set R and added as item r'2 to set R'. In this way, the 5 items with the highest iteratively determined quality are added to set R' (FIG. 9B) and deleted from set R (FIG. 9C).

The Diversity Enhanced recommender then analyses each of the remaining items in R and compares them in turn to r'1, r'2, . . . using the similarity comparison equation. In this way the closest match in R' is determined for each remaining item in R. Note that it is not necessarily the item with the greatest similarity score to t which will be the closest match, i.e. original items r10,r11 and r12 all had a similarity of 0.79 to the target, but are not necessarily similar to one another. When items r11 and r12 are compared to the members of R', it is found that item r11 is indeed similar to r'4 (original r10) but item r12 is more similar to r'1 than r'4.

A column is thus created in the table of R' (FIG. 9D) showing, for each member of R' the closest matches in the remaining members of R. When the results are presented to the user, a separate link for similar matches can also be presented (derived from this new column in the table of FIG. 9D) to retrieve the matches having lower diversity but higher similarity.

Of course, this additional step of determining, for each remaining member of set R the closest matching member in R', adds further processing steps, but the total processing cost will still be significantly less than the cost for the Greedy algorithm, and in certain applications this additional cost may be justified for the increased usability of the results.

Rather than conducting a separate comparison of the remaining members in R with the members of R', the Diversity Enhanced recommender can pass this task to the Retrieval engine, or bypass it entirely. On way of bypassing it is to take advantage of the fact that when the kth item is being chosen for set R', each of the (b(k−1)+1) remaining members in R during this iteration is compared for diversity with the (k−1) members already added to R'. Referring to equation 4 (in which the cases already added are referred to as members of R rather than R'), it can be seen that the relative diversity calculation in the last iteration includes a similarity comparison of each remaining item in R with each item already added to R'. For each item in R, the item in R' giving the highest similarity during this calculation can be indexed for use in presenting the user with similar matches. (This method will not allow any of the members to be indexed against the kth member added to R', but otherwise the most similar "discarded" matches can be retrieved by the user, with no additional processing cost and only an insignificant increase in memory required.)

The Bounded Greedy technique of the present invention is generally applicable, and only requires access to a similarity metric. Of course, the ability to maximise diversity does depend on certain characteristics of the case-base in question, such as the distribution of its cases. For example, diversity can be improved significantly with minimal similarity sacrifices in highly clustered case-bases where ordinarily the risk of retrieving cases with poor diversity characteristics greatly increases.

In the foregoing we have shown that the Bounded Greedy algorithm improves diversity without significantly compromising similarity, and it does so without adversely affecting retrieval time. Moreover, this technique is generally applicable across all case-retrieval systems—all that is required is a standard (or other) similarity metric. Indeed, it can even be used to good effect in other similarity-based reasoning frameworks, such as collaborative filtering.

The invention is not limited to the embodiments described herein which may be modified or varied without departing from the scope of the invention.

The invention claimed is:

1. A computer-implemented data processing method for retrieving a subset of k items from a database of n items (n>>k), the method comprising:
   (a) determining largest set bk items (where b>1 and bk is a set larger than k) in the database of n items which have the greatest similarity to an input query t according to a given similarity function S,
   (b) selecting as the first member of the subset that item of said bk items having the highest similarity S to the query t, and
   (c) iteratively selecting and retrieving each successive member of the subset as that remaining item of said bk items having the highest quality Q, where Q is a given function of similarity S to the input query t and relative diversity RD, wherein relative diversity RD is a given function of the diversity of that remaining item with respect to the items selected during the previous iteration(s);

wherein said input query t and each of the database items is defined in terms of a plurality of parameters, and wherein said similarity function S comprises conducting a comparison between corresponding parameters of the query t and of the item to which the query is being compared to obtain a feature similarity measurement, and summing the feature similarity measurements to arrive at a similarity measurement between the query t and the item to which the query is being compared:

wherein said different feature similarity measurements are given different relative weightings;

wherein said similarity function S is defined between a query t and an item c, each having n features for comparison, as:

$$\text{Similarity}(t, c) = \frac{\sum_{i=1...n} w_i * sim(t_i, c_i)}{\sum_{i=1...n} w_i}$$

wherein $sim(t_i, c_i)$ is a given feature similarity measurement for feature i, and $w_i$, is a weighting for feature i.

2. A computer implemented data processing method as claimed in claim 1, wherein said feature similarity measurement $sim(t_i,c_i)$ is defined to return a value ranging from zero to unity.

3. A computer-implemented data processing method for retrieving a subset of k items from a database of n items (n>>k), the method comprising:

(a) determining largest set bk items (where b>1 and bk is a set larger than k) in the database of n items which have the greatest similarity to an input query t according to a given similarity function S, (b) selecting as the first member of the subset that item of said bk items having the highest similarity S to the query t, and (c) iteratively selecting and retrieving each successive member of the subset as that remaining item of said bk items having the highest quality Q, where Q is a given function of similarity S to the input query t and relative diversity RD, wherein relative diversity RD is a given function of the diversity of that remaining item with respect to the items selected during the previous iteration;

wherein said function of relative diversity RD between the query t and the items $(r_1, \ldots, r_m)$ selected in the previous m iterations comprises summing the dissimilarity between t and each item $(r_1, \ldots, r_m)$ with dissimilarity being measured as a function of the similarity function S;

wherein said relative diversity function further comprises a normalization of the summed dissimilarity measurements by division by m.

4. A computer-implemented data processing method as claimed in claim 3, wherein said similarity function S returns a value of from zero to unity, and wherein said dissimilarity function is defined as the value of the similarity function subtracted from unity.

5. A computer-implemented data processing method as claimed in claim 3, wherein said relative diversity function RelDiversity is defined as follows between a case c and the previously selected members $(r_1, \ldots, r_m)$ of the subset R:

$$\text{RelDiversity}(c, R) = \frac{\sum_{i=1...m}(1 - \text{Similarity}(c, r_i))}{m}$$

6. A computer-implemented data processing method as claimed in claim 1, wherein said relative diversity function RelDiversity is defined as follows between a case c and the previously selected members $(r_1, \ldots, r_m)$ of the subset R:

$$\text{RelDiversity} = 1, \text{ if } R = \{\}$$

$$= \frac{\sum_{i=1...m} \text{DiffFeatures}(c, r_i)}{m},$$

where DiffFeatures$(c,r_i)$=number of features in c that have values different from the equivalent feature in $r_i$.

7. A computer-implemented data processing method as claimed in claim 1, wherein the quality Q of an item c is defined as the product of the similarity of the target t to the item c and the relative diversity of the item c to the items previously selected.

8. A computer-implemented data processing method as claimed in claim 1, wherein the quality Q of an item c is defined as the sum of the similarity of the target t to the item c, adjusted by a first weighting factor, and the relative diversity of the item c to the items previously selected, adjusted by a second weighting factor.

9. A computer-implemented data processing method as claimed in claim 8, wherein the quality Q of the item c is defined as Quality$(t,c,R)=\alpha*$Similarity$(t,c)+(1-\alpha)*$RelDiversity $(c,R)$.

10. A computer-implemented data processing method as claimed in claim 1, wherein the quality Q of an item c is defined as a harmonic mean of the similarity of the target t to the item c and the relative diversity of the item c to the items previously selected.

11. A computer-implemented data processing method as claimed in claim 8, wherein the quality Q of the item c is defined as $$\text{Quality}(t, c, R) = 2 \bigg/ \bigg(\frac{1}{\text{Similarity}(t, c)} + \frac{1}{\text{RelDiversity}(c, R)}\bigg)$$

12. A computer-implemented data processing method as claimed in claim 1, wherein the quality Q of an item c is defined as a weighted harmonic mean of the similarity of the target t to the item c and the relative diversity of the item c to the items previously selected.

13. A computer-implemented data processing system for retrieving a subset of k items from a database of n items (n>>k), the system comprising:
   (a) a first memory area for storing largest set bk items (where b>1 and bk is a set larger than k) in the database of n items which have the greatest similarity to an input query t according to a given similarity function S,
   (b) a second memory area for storing said subset as it is constructed from said bk items, and
   (c) a processor for
      (i) selecting as the first member of the subset that item of said bk items having the highest similarity S to the query t, and
      (ii) iteratively selecting and retrieving each successive member of the subset as that remaining item of said bk items having the highest quality Q, where Q is a given function of similarity S to the input query t and relative diversity RD, wherein relative diversity RD is a given function of the diversity of that remaining item with respect to the items selected during the previous iteration(s);
   wherein said input query t and each of the database items is defined in terms of a plurality of parameters, and wherein said similarity function S comprises conducting a comparison between corresponding parameters of the query t and of the item to which the query is being compared to obtain a feature similarity measurement, and summing the feature similarity measurements to arrive at a similarity measurement between the query t and the item to which the query is being compared;
   wherein said different feature similarity measurements are given different relative weightings;
   wherein said similarity function S is defined between a query t and an item c, each having n features for comparison, as:

$$\mathrm{Similarity}(t, c) = \frac{\sum_{i=1\ldots n} w_i * sim(t_i, c_i)}{\sum_{i=1\ldots n} w_i}$$

wherein $sim(t_i, c_i)$ is a given feature similarity measurement for feature i, and $w_i$ is a weighting for feature i.

14. A computer-implemented data processing system as claimed in claim 13, embodied as a computer running software which includes instructions to allocate said first and second memory areas and instructions to select said first member of said subset and iteratively select said successive members according to rules defining said measures of similarity S, relative diversity RD, and quality Q.

15. A computer-implemented data processing system as claimed in claim 13, further comprising processing means for selecting said bk items from said database.

16. A computer-implemented data processing system as claimed in claim 13, further comprising a communications link to a retrieval system for selecting said bk items from said database.

17. A computer-implemented data processing system as claimed in claim 13, further comprising said database.

* * * * *